US008339801B2

(12) United States Patent
Tominaga et al.

(10) Patent No.: US 8,339,801 B2
(45) Date of Patent: Dec. 25, 2012

(54) ELECTRIC POWER STEERING APPARATUS

(75) Inventors: Tsutomu Tominaga, Chiyoda-ku (JP);
Masahiro Kimata, Chiyoda-ku (JP);
Tadayuki Fujimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 12/864,200

(22) PCT Filed: Jan. 25, 2008

(86) PCT No.: PCT/JP2008/051081
§ 371 (c)(1),
(2), (4) Date: Jul. 22, 2010

(87) PCT Pub. No.: WO2009/093331
PCT Pub. Date: Jul. 30, 2009

(65) Prior Publication Data
US 2010/0295498 A1    Nov. 25, 2010

(51) Int. Cl.
*H01R 9/00* (2006.01)
(52) U.S. Cl. ......... 361/775; 361/752; 361/807; 361/810
(58) Field of Classification Search ............ 180/44, 180/444; 361/752–753, 775, 807–810; 439/76.1–76.2
See application file for complete search history.

(56) References Cited

U.S. PATENT DOCUMENTS

| | | | |
|---|---|---|---|
| 6,548,972 B2 * | 4/2003 | Takagi | 318/293 |
| 6,906,483 B2 | 6/2005 | Tominaga et al. | |
| 7,021,418 B2 * | 4/2006 | Tominaga et al. | 180/444 |
| 7,453,179 B2 | 11/2008 | Innami et al. | |
| 2001/0021103 A1 | 9/2001 | Takagi | |
| 2003/0173920 A1 | 9/2003 | Tominaga et al. | |
| 2005/0269895 A1 * | 12/2005 | Innami et al. | 310/218 |

FOREIGN PATENT DOCUMENTS

| | | |
|---|---|---|
| EP | 1116640 A2 | 7/2001 |
| EP | 1 615 317 A1 | 1/2006 |
| JP | 2000-043740 A | 2/2000 |

(Continued)

OTHER PUBLICATIONS

Korean Office Action dated Mar. 20, 2012.
European Search Report issued in Application No. 08710582.1 dated Jul. 26, 2012.

*Primary Examiner* — Tuan T Dinh
(74) *Attorney, Agent, or Firm* — Sughrue Mion, PLLC

(57) ABSTRACT

Provided is an electric power steering apparatus which allows a reduction in apparatus size as well as in noise. A controller (20) includes: a metal board (22), on which a bridge circuit including a plurality of semiconductor switching elements (Q1 to Q6) for switching a current of an electric motor (1) is mounted; capacitors (31) for absorbing a ripple of the current; a control board (29), on which a microcomputer (33) for generating a drive signal for controlling the bridge circuit is mounted; and a connection member formed by insert molding high-current conductive plates (24 and 25), through which a high current flows, and signal conductive plates (26), to/from which a low-current signal is input/output, with a frame (23a) made of an insulating resin provided in proximity to an outer periphery of the metal board (22), in which the capacitors (31) are arranged in a row along an end surface of one side of the metal board (22) and are electrically connected to the high-current conductive plates (24).

10 Claims, 6 Drawing Sheets

FOREIGN PATENT DOCUMENTS

| | | |
|---|---|---|
| JP | 2001-196770 A | 7/2001 |
| JP | 2001-206232 A | 7/2001 |
| JP | 2001196770 A | 7/2001 |
| JP | 2003-267233 A | 9/2003 |
| JP | 3638269 B2 | 9/2003 |
| JP | 2004-017884 A | 1/2004 |
| JP | 2005-304203 A | 10/2005 |
| JP | 2005-348522 A | 12/2005 |
| JP | 2007-276741 A | 10/2007 |
| KR | 10-0119573 B1 | 10/1997 |

\* cited by examiner

ELECTRIC POWER STEERING APPARATUS

CROSS REFERENCE TO RELATED APPLICATIONS

This application is a National Stage of International Application No. PCT/JP2008/051081 filed Jan. 25, 2008, the contents of which is incorporated herein by reference in its entirety.

TECHNICAL FIELD

The present invention relates to an electric power steering apparatus including an electric motor for outputting an assist torque to a handle of a vehicle and a controller for controlling drive of the electric motor.

BACKGROUND ART

Conventionally, an electric power steering apparatus including an electric motor for outputting an assist torque to a handle of a vehicle and a controller for controlling drive of the electric motor, the controller being mounted to the electric motor, is known (for example, see Patent Document 1).

This conventional electric power steering apparatus includes a power board, on which a bridge circuit for switching a current of the electric motor is mounted, a control board, on which a microcomputer for generating a drive signal for controlling the bridge circuit is mounted, and a high-current board, on which conductive plates constituting a wiring pattern for a high current are formed by insert molding and capacitors for absorbing a current ripple are mounted. Then, the three boards form a triple-layer structure in which the power board, the high-current board, and the control board are superposed in the stated order. The power board and the high-current board are electrically connected to each other by a connection member.

Patent Document 1: JP 3638269 B

DISCLOSURE OF THE INVENTION

Problem to be Solved by the Invention

However, the prior art has the following problems.

The conventional electric power steering apparatus includes the three boards used for the controller, that is, the power board, the high-current board, and the control board, and has the triple-layer structure in which the capacitors mounted on the high-current board are sandwiched between the power board and the control board. Therefore, a height of the controller is increased.

Moreover, the capacitors are connected to the bridge circuit provided on the power board through an intermediation of the conductive plates of the high-current board and the connection member. Therefore, a distance between the capacitors and the bridge circuit is increased to lower performance of absorbing the ripple of the current. As a result, there are problems in that the apparatus is increased in size and that noise generated by PWM drive is increased to adversely affect other control devices.

The present invention has been made to solve the problems described above, and has an object to provide an electric power steering apparatus which allows a reduction in apparatus size as well as in noise.

Means for Solving the Problems

An electric power steering apparatus according to the present invention includes: an electric motor for outputting an assist torque to a handle of a vehicle; and a controller for controlling drive of the electric motor, in which the controller includes: a power board, on which a bridge circuit including a plurality of semiconductor switching elements for switching a current of the electric motor according to the assist torque is mounted; capacitors for absorbing a ripple of the current switched by the plurality of semiconductor switching elements; a control board, on which a microcomputer for generating a drive signal for controlling the bridge circuit based on a steering torque of the handle is mounted; and a connection member formed by insert molding high-current conductive plates, through which a high current flows, and signal conductive plates, to/from which a low-current signal is input/output, with a frame-like insulating resin provided in proximity to an outer periphery of the power board, and in which the capacitors are arranged in a row along an end surface of one side of the power board and are electrically connected to the high-current conductive plates.

Effects of the Invention

According to the electric power steering apparatus of the present invention, the capacitors are provided in proximity to the periphery of the power board. As a result, the electric power steering apparatus which allows a reduction in apparatus size as well as in noise may be obtained.

BEST MODE FOR CARRYING OUT THE INVENTION

Hereinafter, an embodiment of the present invention is described with reference to the drawings. In the following embodiment, the same or equivalent components and parts are denoted by the same reference symbols for description.

First Embodiment

Figure 1:
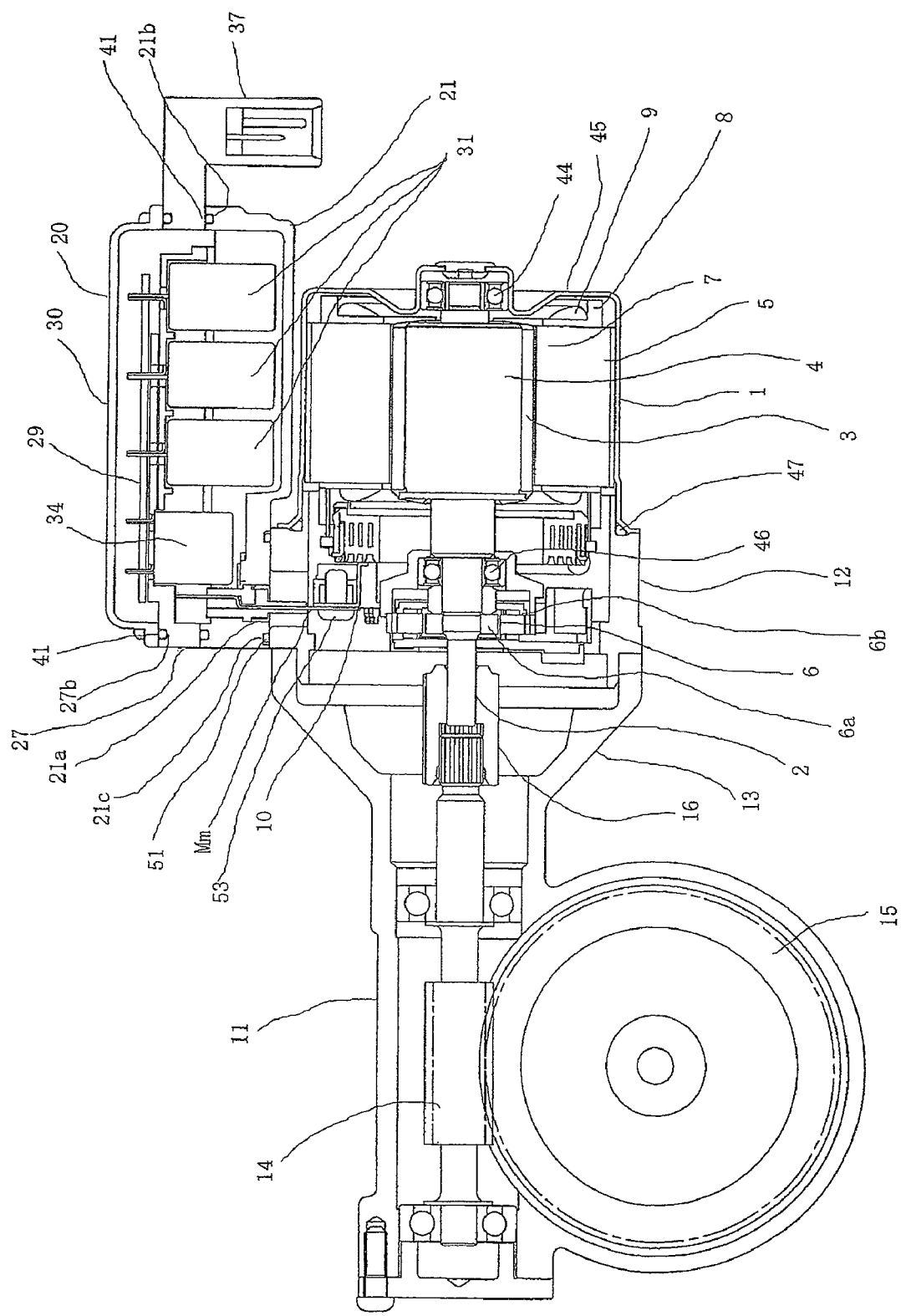
FIG. 1 is a sectional view illustrating an electric power steering apparatus according to a first embodiment of the present invention.
Figure 2:
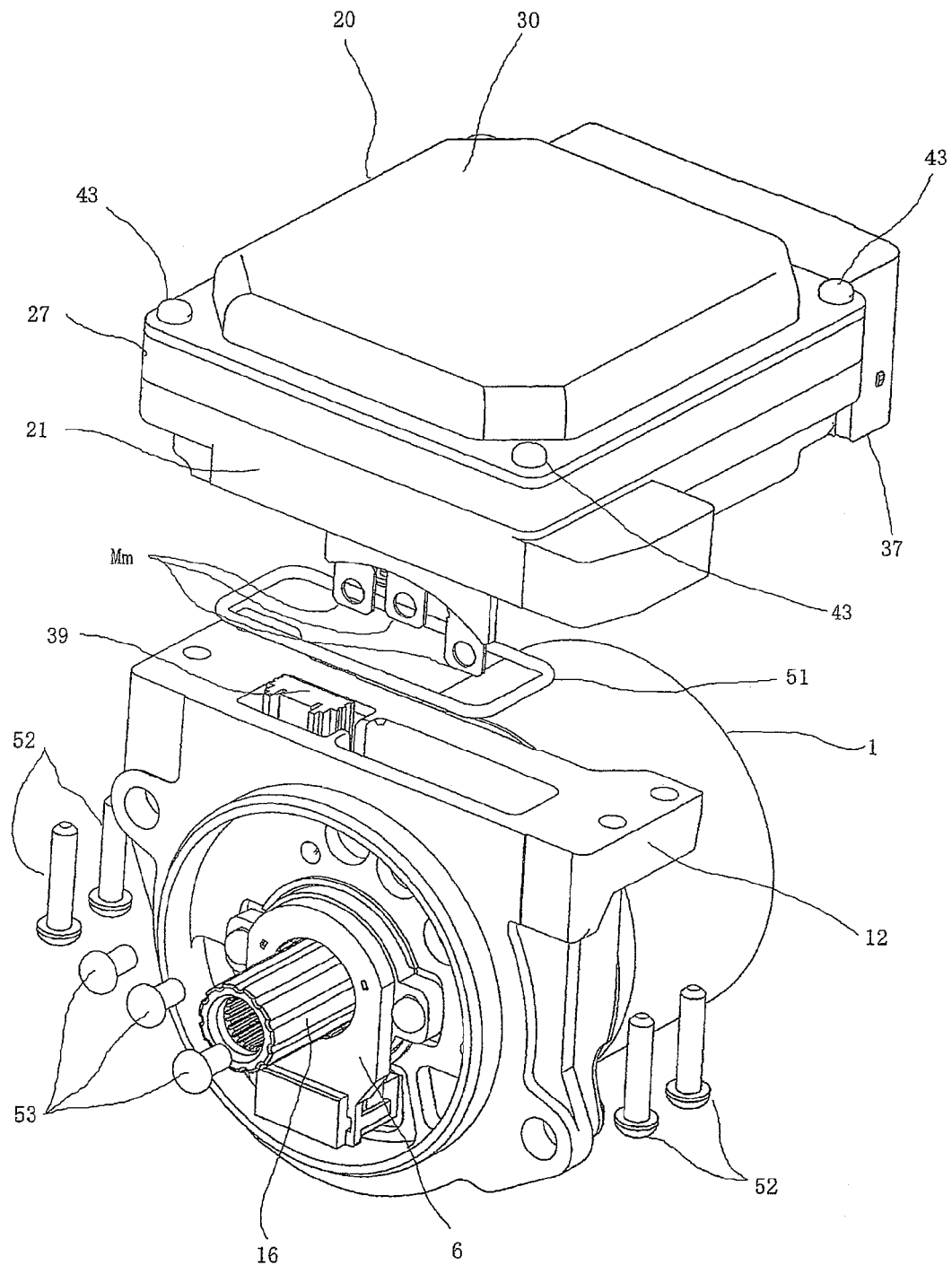
FIG. 2 is an exploded perspective view illustrating the electric power steering apparatus illustrated in FIG. 1 according to the first embodiment of the present invention.
Figure 3:
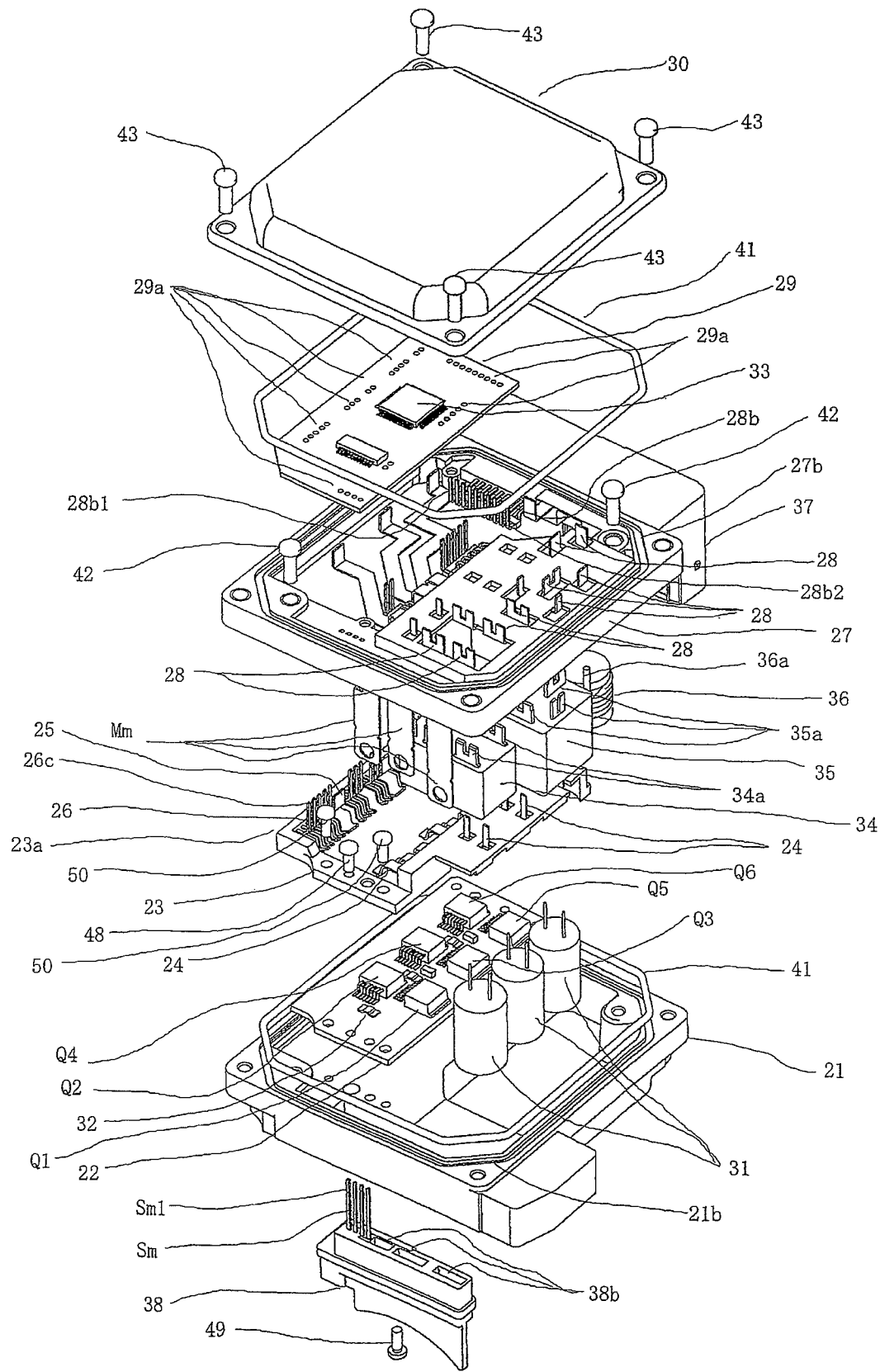
FIG. 3 is an exploded perspective view illustrating a controller 20 illustrated in FIG. 2 according to the first embodiment of the present invention.

FIG. 1 is a sectional view illustrating an electric power steering apparatus according to a first embodiment of the present invention. FIG. 2 is an exploded perspective view illustrating the electric power steering apparatus illustrated in FIG. 1 according to the first embodiment of the present invention. Further, FIG. 3 is an exploded perspective view illustrating a controller 20 illustrated in FIG. 2 according to the first embodiment of the present invention.

An electric motor 1 of the electric power steering apparatus in this first embodiment, which is in the form of a three-phase brushless motor, includes an output shaft 2, a rotor 4 including a permanent magnet 3 having eight magnetic poles, which is fixed to the output shaft 2, a stator 5 provided around the rotor 4, and a rotational position sensor 6 for detecting a rotational position of the rotor 4, which is provided on an output side of the output shaft 2.

The stator 5 includes twelve salient poles 7 which are opposed to an outer periphery of the permanent magnet 3, insulators 8 mounted to the salient poles 7, and armature windings 9 which are wound around the insulators 8 and are connected to three phases, that is, U-, V-, and W-phases. Three ends of the armature windings 9 are respectively connected to three winding terminals 10 extending in an axial direction of the output shaft 2 toward an output side.

The rotational position sensor 6 in this first embodiment is a resolver, and includes a resolver rotor 6a and a resolver stator 6b. An outer diameter of the resolver rotor 6a has a special curve profile such that a permeance of a radial gap between the resolver stator 6b and the resolver rotor 6a varies in a sinusoidal form according to an angle. An exciting coil and two sets of output coils are wound around the resolver stator 6b. The rotational position sensor 6 detects a variation in the radial gap between the resolver rotor 6a and the resolver stator 6b to output two-phase output voltages which change in a sine curve and in a cosine curve.

The electric motor 1 is fixed to a reduction gear 11 corresponding to a reduction mechanism. The reduction gear 11 includes a gear case 13 to which a bracket 12 of the electric motor 1 is attached, a worm gear 14 for decelerating the rotation of the output shaft 2, which is provided inside the gear case 13, and a worm wheel 15 which is in meshing engagement with the worm gear 14.

A spline is formed at an end of the worm gear 14 on the electric motor 1 side. A coupling 16 having a spline formed on the inner side thereof is pressed over an end of the output shaft 2 on the reduction gear 11 side. The coupling 16 and the end of the worm gear 14 are brought into spline engagement. A torque is transmitted from the electric motor 1 to the reduction gear 11 through the coupling 16.

A controller 20 for controlling the drive of the electric motor 1 is fixed to the bracket 12 of the electric motor 1. The controller 20 includes a heat sink 21 made of aluminum, which has a box-like shape and a high thermal conductivity, a metal board 22 provided inside the heat sink 21, which serves as a power board, a connection member 23 provided on the metal board 22, which includes a plurality of conductive plates 24, 25, and 26 formed by insert molding with an insulating resin, a housing 27 provided on an opening end of the heat sink 21, which includes a plurality of conductive plates 28 formed by insert molding with an insulating resin, a control board 29 formed of an insulating printed-circuit board, which is provided over the metal board 22, and a cover 30 housing the metal board 22, the connection member 23, the control board 29, and the like therein in cooperation with the heat sink 21 and the housing 27. The heat sink 21, the housing 27, and the cover 30 are mounted in parallel to an axial direction of the electric motor 1.

The metal board 22 is made of an HITT substrate (a brand name of a product manufactured by Denki Kagaku Kogyo K.K.). A wiring pattern is formed as a copper pattern of 100 μm on an aluminum substrate of 2 mm in thickness through an intermediation of an insulating layer of 80 μm in thickness. Onto the wiring pattern formed on the metal board 22, semiconductor switching elements (for example, MOSFETs) Q1 to Q6 which constitute a three-phase bridge circuit for switching a motor current of the electric motor 1, capacitors 31 for absorbing a ripple of the motor current, high-current components such as a shunt resistor 32 for detecting the current of the electric motor 1, and ends of the conductive plates 24, 25, and 26 of the connection member 23 are mounted by soldering.

The connection member 23, which is provided in parallel to the axial direction of the electric motor 1, is formed by insert molding the conductive plates 24, 25, and 26 with a frame 23a made of an insulating resin, which is provided in proximity to an outer periphery of the metal board 22. The conductive plates 24 are high-current conductive plates for allowing the current from a battery (not shown) of a vehicle to flow through the wiring pattern of the metal board 22. Further, the three capacitors 31, which are arranged in a row along an end surface of one side of the metal board 22, are electrically connected to the conductive plates 24.

The conductive plates 25 are high-current conductive plates for allowing the current to flow from the wiring pattern of the metal board 22 to the armature windings 9 of the electric motor 1. The conductive plates 26 are signal conductive plates for connecting the wiring pattern of the metal board 22 and a wiring pattern of the control board 29 to each other, to/from which a low-current signal is input/output.

Portions where the conductive plates 24, 25, and 26 and the wiring pattern of the metal board 22 are electrically connected to each other and portions where the conductive plates 26 and the wiring pattern of the control board 29 are electrically connected to each other are located inside the frame 23a.

Figure 4:
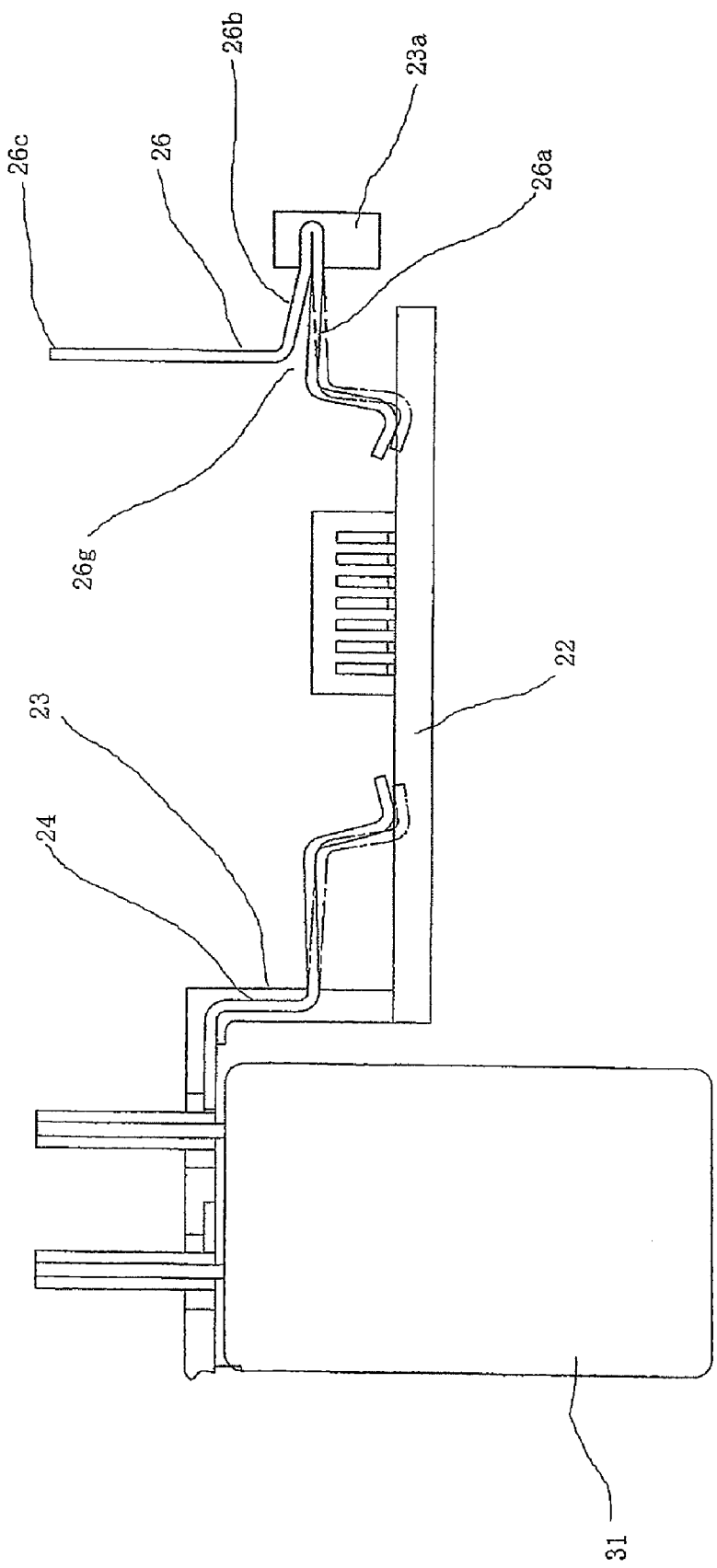
FIG. 4 is a sectional view illustrating a principal part of the controller 20 illustrated in FIG. 2 according to the first embodiment of the present invention.

FIG. 4 is a sectional view illustrating a principal part of the controller 20 illustrated in FIG. 2 in the first embodiment of the present invention. As illustrated in FIG. 4, the signal conductive plates 26 are provided on a side which is opposed to a side on which the capacitors 31 are located, and each of the signal conductive plates includes a first path 26a passing from the frame 23a to the metal board 22 and a second path 26b passing from the frame 23a to the control board 29. Further, a gap 26g is formed in an area in which the first paths 26a and the second paths 26b are opposed to each other.

The signal conductive plates 26 are pressed against the wiring pattern of the metal board 22 by an elastic force generated by the deflection of the first paths 26a. Because the gap 26g is formed, the second paths 26b are not deformed by the deformation of the first paths 26a at this time. Therefore, ends 26c of the second paths 26b may be easily inserted into through holes 29c of the control board 29. The ends 26c of the second paths 26b are arranged on a straight line.

Low-current components such as a microcomputer 33 and peripheral circuit elements including a drive circuit (not shown) and a motor current detecting circuit (not shown) are mounted onto the wiring pattern formed on the control board 29 by soldering.

The microcomputer 33 computes an assist torque based on the current detection circuit (not shown) for detecting the motor current flowing through the electric motor 1 through an end of the shunt resistor 32 and a steering torque signal from a torque sensor (not shown). Further, the microcomputer 33 feeds back the motor current and the rotational position of the rotor 4, which is detected by the rotational position sensor 6, to compute a current corresponding to the assist torque. Then, the microcomputer 33 outputs a drive signal for controlling the semiconductor switching elements Q1 to Q6 of the bridge circuit.

Although not shown, the microcomputer 33 has a known self-diagnosis function in addition to an A/D converter, a PWM timer circuit and the like so as to constantly self-diagnose whether or not a system is operating normally. Upon judgment of the occurrence of an abnormality in the system, the microcomputer 33 cuts off the motor current.

Inside the housing 27, the plurality of conductive plates 28 formed by insert molding with the insulating resin constitute a wiring pattern. The plurality of conductive plates 28 are exposed from the insulating resin at the positions where electrical connection is to be made. Motor terminals Mm, which are formed as ends of the conductive plates 28, project from a hole 21a corresponding to an opening formed through the heat sink 21 and are inserted into the electric motor 1 to be electrically connected to the winding terminals 10.

The motor terminals Mm are constituted by three paths. A motor relay 34 corresponding to switching means for allowing the flow of the motor current and cutting off the motor current supplied from the bridge circuit to the electric motor 1 is connected to two of the three paths. The motor relay 34 has a configuration in which a single relay has two normally-open contacts.

A power source relay 35 and a coil 36 are connected to the conductive plates 28 provided inside the housing 27. The power source relay 35 allows the flow of the current and cuts off the current supplied from the battery of the vehicle to the bridge circuit. The coil 36 prevents electromagnetic noise generated at the time of the switching operation of the bridge circuit from flowing out to the exterior.

The motor relay 34, the power source relay 35, and the coil 36 are inserted from a lower surface side of the housing 27. As a result, terminals 34a of the motor relay 34, terminals 35a of the power source relay 35, and a terminal 36a of the coil 36 pass through the insulating resin of the housing 27 to project from an upper surface of the housing 27, and are welded to the conductive plates 28 exposed from the insulating resin so as to be electrically connected thereto.

A connector 37 is integrally formed of the insulating resin with the housing 27. The connector 37 includes: a vehicle connector 37a obtained by integrating a power connector to be electrically connected to the battery of the vehicle and a signal connector, to/from which the signal is input/output from/to a vehicle side through an external wiring, and a torque sensor connector 37b to which the signal is input from the torque sensor.

Conductive plates 28a for driving the motor relay 34 and the power source relay 35, conductive plates 28b forming a terminal of the signal connector and a terminal of the torque sensor connector of the connector 37 and the like are formed by insert molding with the insulating resin of the housing 27.

Vertical portions 28a1 and 28b1 are formed by ends of the conductive plates 28a and 28b, which are exposed from the insulating resin of the housing 27 so as to be vertically bent. Ends of the vertical portions 28a1 and 28b1 are inserted into through holes 29a of the control board 29 to be electrically connected to the wiring pattern of the control board 29. A central portion of each of horizontal portions 28a2 and 28b2 respectively in connection with the vertical portions 28a1 and 28b1 is covered with an insulating resin 27a of the housing 27.

Figure 5:
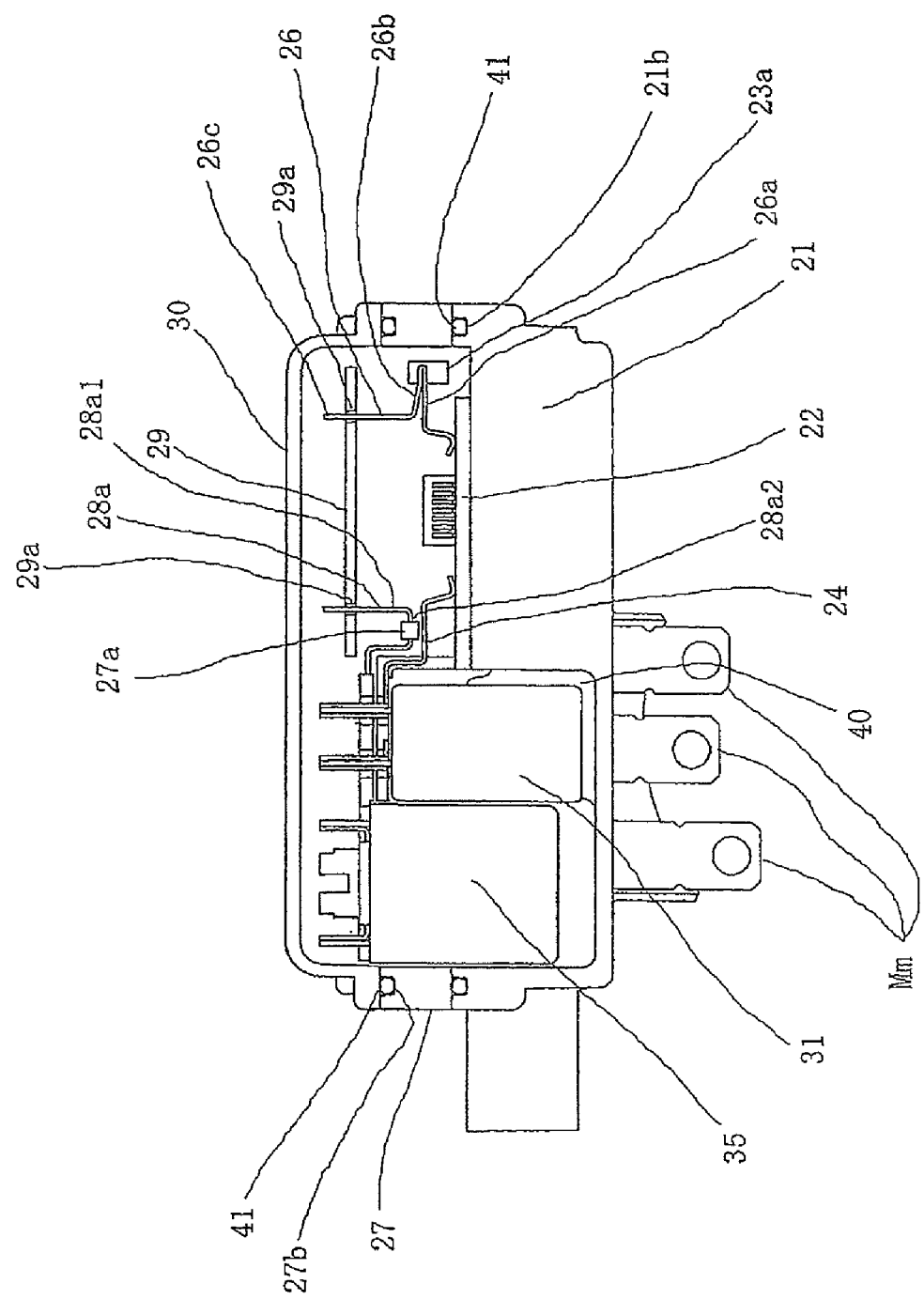
FIG. 5 is a sectional view illustrating the controller illustrated in FIG. 2 according to the first embodiment of the present invention.

FIG. 5 is a sectional view of the controller illustrated in FIG. 2 in the first embodiment of the present invention. As illustrated in FIG. 5, the insulating resin 27a is present between the conductive plates 24 of the connection member 23 and the conductive plates 28a of the housing 27. In this manner, the conductive plates 28a and the conductive plates 24 are not electrically short-circuited even if the conductive plates 28a are deformed downward when the conductive plates 28a are inserted into the through holes 29a of the control board 29.

Figure 6:
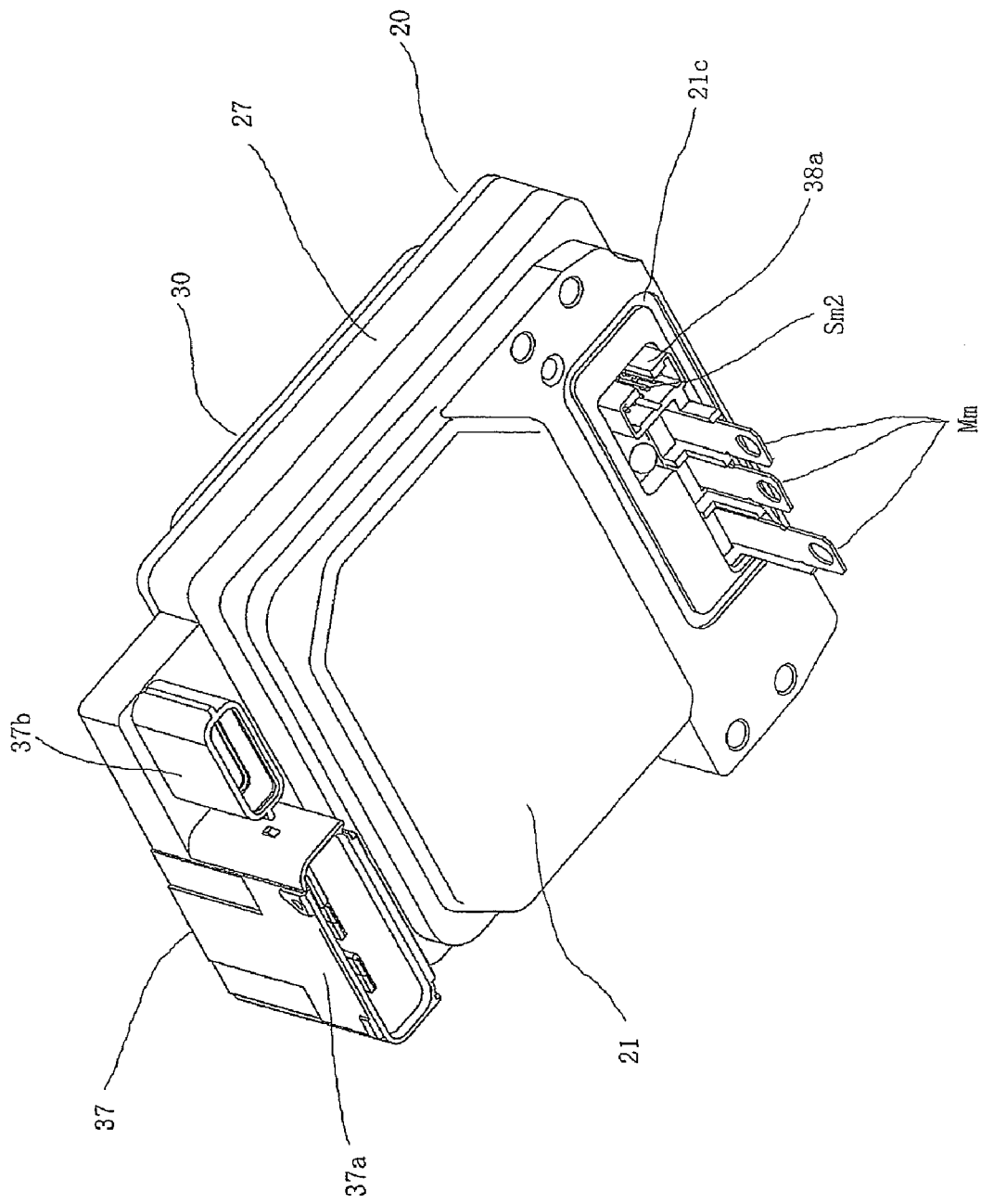
FIG. 6 is a perspective view of the controller illustrated in FIG. 2 according to the first embodiment of the present invention, as viewed from an electric motor side.

Sensor terminals Sm for transmitting the signal from the rotational position sensor 6 to the microcomputer 33 are formed on the sensor connector 38 by insert molding with the insulating resin. One end Sm1 of each of the sensor terminals Sm, which is exposed from the insulating resin, is electrically connected to the wiring pattern of the control board 29 by solder joint. The other end Sm2 of each of the sensor terminals Sm is exposed inside a connection portion 38a. FIG. 6 is a perspective view of the controller illustrated in FIG. 2 in the first embodiment of the present invention as viewed from the electric motor side, and illustrates the other ends Sm2 exposed inside the connection portion 38a.

The engagement of the connection portion 38a with the sensor connector 39 (see FIG. 2) of the electric motor 1 electrically connects the ends Sm2 to the rotational position sensor 6 of the electric motor 1. Three holes 38b, through which the motor terminals Mm to be electrically connected to the armature windings 9 pass, are formed in the sensor connector 38, as illustrated in FIG. 3.

The sensor connector 38 is inserted into the hole 21a corresponding to the opening of the heat sink 21 to be fixed to the heat sink 21. The housing 27 is mounted while being interposed between the heat sink 21 and the cover 30. The motor terminals Mm are configured so as to project externally from the holes 38b by mounting the housing 27.

As illustrated in FIG. 5, a silicon adhesive 40 corresponding to a highly thermally conductive adhesive is applied to a gap between a head portion of each of the capacitors 31 which is opposite to terminals thereof and the heat sink 21 and a gap between a side surface of each of the capacitors 31 and the heat sink 21. The capacitors 31 are fixed to the heat sink 21 by the silicon adhesive 40.

A rubber ring 41 is inserted into a groove 21b formed around the opening of the heat sink 21. As a result, air tightness between a surface of the heat sink 21 and that of the housing 27, which are held in contact with each other, is ensured when the housing 27 is fixed to the heat sink 21 by screws 42. Similarly, another rubber ring 41 is inserted into a groove 27b formed around an upper opening of the housing 27. As a result, air tightness between a surface of the housing 27 and that of the cover 30, which are held in contact with each other, is ensured when the cover 30 is fixed to the heat sink 21 by screws 43 with the housing 27 interposed therebetween.

Next, a procedure of assembly of the thus configured electric power steering apparatus is described. First, the electric motor 1 is assembled. At the time of the assembly, after being fixed to the output shaft 2 by adhesion, the permanent magnet 3 is magnetized to have eight poles by a magnetizer. An inner ring of a bearing 44 is press-fitted to form the rotor 4.

Next, the armature windings 9 of the U-, V-, and W-phases are wound around the twelve salient poles 7 of the stator 5 through an intermediation of the insulators 8 while being shifted by 120 degrees in electrical angle for each, thereby forming four windings for each of the U-, V-, and W-phases, in total, twelve windings.

Winding-start ends of the windings of the U-phase are connected to each other, whereas winding-termination ends thereof are connected to each other, thereby forming the U-phase armature winding. Similarly, the V-phase and W-phase armature windings are formed. Then, winding-termination ends of the U-phase, V-phase, and W-phase armature windings are connected to each other to form a neutral point. Then, winding-start ends of the U-phase, V-phase, and W-phase armature windings are respectively connected to the winding terminals 10. Then, the stator 5, around which the winding is performed, is press-fitted into a yoke 45.

Next, after an outer ring of a bearing 46 is fixed to the bracket 12, the output shaft 2 of the rotor 4 is press-fitted into the inner ring of the bearing 46 so as to press the rotor 6a of the rotational position sensor 6 and the coupling 16 over the output shaft 2. Further, the stator 6b of the rotational position sensor 6 is fixed to the bracket 12. Thereafter, the yoke 45, into which the stator 5 is incorporated, is inserted into the bracket 12 while a rubber ring 47 is mounted to an end of the outer periphery of the bracket 12. Thereafter, the yoke 45 is fixed to the bracket 12 by screws (not shown).

Next, a procedure of assembly of the controller 20 is described.

First, the components such as the microcomputer 33b and the peripheral circuit elements thereof are arranged on the control board 29 including electrodes, each being applied with a cream solder. Further, by using a reflow device, heating is performed from the bottom side of the control board 29 or the entire ambient atmosphere is heated to melt the cream solder to solder each of the components.

Similarly, the components such as the semiconductor switching elements Q1 to Q6 and the shunt resistor 32 are arranged on the metal board 22 including electrodes, each being applied with the cream solder. The connection member 23 is placed on the metal board 22 so as to be fixed thereto by the screws 48. Further, the cream solder is melted by using the reflow device to solder each of the components and the ends of the conductive plates 24, 25, and 26 of the connection member 23. At this time, as illustrated in FIG. 4, the ends of the conductive plates 24, 25, and 26, which project downward beyond an upper surface of the metal board 22, are deflected to be positioned on an upper surface of the metal board 22. By the elastic force generated by the deflection, the ends of the conductive plates 24, 25, and 26 are pressed against the wiring pattern of the metal board 22.

By the soldering, the first paths 26a of the signal conductive plates 26 are deflected. However, since the gap 26g is formed between the first paths 26a and the second paths 26b, the second paths 26b are not deformed by the deflection of the first paths 26a. As a result, the ends 26c of the second paths 26b are arranged linearly so as to be perpendicular to the metal board 22.

Thereafter, the capacitors 31 are provided at predetermined positions inside the connection member 23. The terminals of the capacitors 31, which project from the upper surface of the connection member 23, are connected to the conductive plates 24 by resistance welding.

Next, the coil 36, the power source relay 35, and the motor relay 34 are inserted into the housing 27 from the bottom surface side so as to be located at predetermined positions. As a result, the terminals of the coil 36, the power source relay 35, and the motor relay 34 project from the upper surface of the housing 27 so as to be bonded to the conductive plates 28 exposed from the insulating resin by welding.

Next, the sensor connector 38 is mounted into the hole 21a of the heat sink 21 from the exterior so as to be fixed to the heat sink 21 by screws 49. Thereafter, the silicon adhesive 40 is applied to an area of the heat sink 21 which is opposed to the head portions and the side surfaces of the capacitors 31. Then, the metal board 22 is introduced from the opening side of the heat sink 21 so as to be located therein.

Thereafter, the metal board 22 is fixed to the heat sink 21 by screws 50. At this time, the gap formed between the head portions of the capacitors 31 and the heat sink 21 and the gap formed between the side surfaces of the capacitors 31 and the heat sink 21 are filled with the silicon adhesive 40. As a result, the capacitors 31 are fixed to the heat sink 21. Moreover, because the metal board 22 is also fixed to the heat sink 21 by the screws 50 at four corners, the metal board 22 is pressed against the heat sink 21 so as to be brought into close contact therewith.

Thereafter, the rubber ring 41 is inserted into the groove 21b formed on the outer peripheral surface of the opening of the heat sink 21. The housing 27 is placed on the heat sink 21, and is then fixed to the heat sink 21 by the screws 42. After the housing 27 is mounted, the motor terminals Mm are guided by the holes 38b of the sensor connector 38, which is previously mounted, so that the motor terminals Mm project externally from the holes 38b.

Thereafter, the conductive plates 28 of the housing 27 and the conductive plates 24 and 25 of the connection member 23 placed on the metal board 22 are electrically connected to each other by welding.

Thereafter, the ends 26c of the conductive plates 26, the ends of the vertical portions 28a1 and 28b1 of the conductive plates 28, and the terminals Sm1 of the sensor terminals Sm and the like are inserted into the respective through holes 29a of the control board 29, and are soldered to be connected at a time by local jet.

Since the ends 26c of the conductive plates 26 are arranged on one straight line at this time, the insertion into the through holes 29a of the control board 29 is facilitated. Moreover, because the central portion of each of the conductive plates 28a is covered with the insulating resin 27a, the conductive plates 28a and the conductive plates 24 are not electrically short-circuited even if the conductive plates 28a are deformed downward when the conductive plates 28a are inserted into the through holes 29a of the control board 29.

Next, the rubber ring 41 is inserted into the groove 27b of the opening of the housing 27. The cover 30 is placed on the housing 27 and is fixed to the heat sink 21 by the screws 43 with the housing 27 interposed therebetween.

Next, the electric motor 1 and the controller 20, which are separately assembled, are combined. A rubber ring 51 is mounted into a groove 21c of the housing 21 of the controller 20. As illustrated in FIG. 2, the controller 20 is fixed to the bracket 12 of the electric motor 1 by screws 52. At this time, the sensor connector 39 of the rotational position sensor 6 on the side of the electric motor 1 side and the connection portion 38a of the sensor connector 38 on the controller 20 side are fitted so as to be electrically connected to each other.

Next, the winding terminals 10 of the electric motor 1 and the motor terminals Mm of the controller 20 are fixed by screws 53 so as to be electrically connected to each other.

As described above, according to the first embodiment, the controller includes: a metal board, on which a bridge circuit including a plurality of semiconductor switching elements for switching a current of the electric motor according to the assist torque to the handle is mounted, capacitors for absorbing a ripple of the current, a control board, on which a microcomputer for generating a drive signal for controlling the bridge circuit based on a steering torque of the handle is mounted, and a connection member formed by insert molding high-current conductive plates, through which a high current flows, and signal conductive plates, to/from which a low-current signal is input/output, with a frame of an insulating resin provided in proximity to an outer periphery of the metal board. The capacitors are arranged in a row along an end surface of one side of the metal board and are electrically connected to the high-current conductive plates. With such a configuration, the capacitors are provided in proximity to the periphery of the power board, and, as a result, a reduction in apparatus size is achieved and noise due to PWM drive is reduced.

The controller is fixed to the bracket of the electric motor by the screws. As a result, an external wiring and a connector for electrically connecting the electric motor and the controller to each other are no longer required. Therefore, apparatus cost and power losses may be reduced, whereas radiation noise may be suppressed.

Moreover, the controller is fixed to the bracket of the electric motor by the screws. The sensor connector of the rotational position sensor on the electric motor side and the connection portion of the sensor connector on the controller side are fitted so as to be electrically connected to each other. As a result, the external wiring is no longer required, thereby reducing the apparatus cost.

Further, only the low-current components such as the microcomputer and the peripheral circuit elements thereof are mounted on the control board. As a result, a width and a thickness of the wiring pattern of the control board are not required to be increased, and hence the components may be mounted at a high density. Thus, the board may be reduced in size to allow a reduction in apparatus size.

Further, the configuration is made such that the motor terminals projecting from the housing by a long distance are guided by the holes of the previously mounted sensor connector so that the motor terminals project externally from the holes at the time of mounting of the housing. As a result, the motor terminals are not damaged at the time of assembly, and hence the reliability of the apparatus may be improved.

Further, each of the signal conductive plates has one end electrically connected to the wiring pattern formed on the metal board and another end electrically connected to the control board, and portions where electrical connection to the metal board and the control board is made are located on the inner side. As a result, the side of the frame, into which the signal conductive plates are inserted, may be located in proximity to the inner side of the housing. Therefore, the apparatus size is reduced.

Further, the signal conductive plates are located on the side of the frame which is opposed to the side along which the capacitors are arranged. As a result, the side of the frame, into which the signal conductive plates are inserted, may be located in proximity to the inner side of the housing 27. Therefore, the apparatus size is reduced.

Further, the ends of the signal conductive plates, which are inserted into the through holes of the control board, are arranged on an approximately straight line. As a result, the insertion into the through holes of the control board is facilitated, thereby improving workability.

Further, each of the signal conductive plates has the first path passing from the frame to the metal board and the second path passing from the frame to the control board, and the gap is formed in the area in which the first path and the second path are opposed to each other. As a result, the second paths are not deformed by the deformation of the first paths, and hence the ends of the second paths are located so as to be perpendicular to the metal board. Therefore, the ends of the second paths may be easily inserted into the through holes of the control board, thereby improving the workability.

Further, the signal conductive plates are pressed against the metal board by the elastic force due to the deflection of the first paths. As a result, even when a crack or the like is generated due to a change with time in a portion where one ends of the signal conductive plates and the wiring pattern formed on the metal board are soldered, the electrical connection is maintained. Therefore, the reliability of the electrical connection between the one ends of the signal conductive plates and the wiring pattern formed on the metal board is improved.

Further, the vertical portion is formed on the end of each of the conductive plates, which is exposed from the insulating resin inside the housing to reach the control board, and the vertical portion is inserted into each of the through holes of the control board so as to be electrically connected to the wiring pattern of the control board, while a part of the horizontal portion in connection with the vertical portion is covered with the insulating resin. As a result, even if the conductive plates are deformed downward when the conductive plates are inserted into the through holes of the control board, the conductive plates are not electrically short-circuited with the conductive plates of the connection member. Therefore, the reliability of the electrical connection of the apparatus is improved.

Moreover, the heat sink, onto which the metal board is fixed, is provided. The gap formed between the head portions of the capacitors and the heat sink and the gap formed between the side surfaces of the capacitors and the heat sink are filled with the highly thermally conductive silicon adhesive to fix the capacitors to the heat sink. As a result, heat generated from the capacitors is released to the heat sink. Thus, an increase in temperature of the capacitors may be suppressed, while the durability of the capacitors is improved.

Although the number of poles of the permanent magnet 3 is eight and the number of salient poles of the stator 5 is twelve in the first embodiment described above, the number of poles and the number of salient poles are not limited to this combination. A combination of a different number of poles and a different number of salient poles may also be used. Moreover, because the electric power steering apparatus is mounted in an engine room, the rubber rings 41, 47, and 51 are inserted so as to ensure water-proofness. However, the electric power steering apparatus may also be mounted in a vehicle interior. In this case, the rubber rings 41, 47, and 51 may be removed.

Further, although the HITT substrate is used as the metal board 22, the metal board 22 is not limited to the HITT substrate. Other metal boards such as a metal board including a wiring pattern formed on a metal base having good thermal conductivity, which is made of aluminum or the like, through an intermediation of an insulating layer, a metal board made of copper or the like, which has good thermal conductivity, or a ceramic board may be used.

Moreover, although the resolver is used as the rotational position sensor 6, the rotational position sensor 6 is not limited to the resolver. As the rotational position sensor, other magnetic detection elements such as a magneto resistor (MR), a giant magneto resistor (GMR), a hall device, or a hall IC may also be used.

The electric motor 1 is not limited to the brushless motor, and may also be an induction motor, a switched reluctance motor (SR motor), or a DC motor with a brush.

As the motor relay 34, two or three relays, each having one normally-open contact, may be mounted. In addition, the motor relay 34 may be omitted. Further, although the screws are used to fix each of the components, other fixing means such as a rivet may be used.

The invention claimed is:

1. An electric power steering apparatus, comprising:
an electric motor for outputting an assist torque to a handle of a vehicle; and
a controller for controlling drive of the electric motor,
wherein the controller comprises:
a power board, on which a bridge circuit including a plurality of semiconductor switching elements for switching a current of the electric motor according to the assist torque is mounted;

capacitors for absorbing a ripple of the current switched by the plurality of semiconductor switching elements;

a control board, on which a microcomputer for generating a drive signal for controlling the bridge circuit based on a steering torque of the handle is mounted; and a connection member formed by insert molding high-current conductive plates, through which a high current flows, and signal conductive plates, to/from which a low-current signal is input/output, with a frame-like insulating resin provided in proximity to an outer periphery of the power board, wherein the capacitors are arranged in a row along an end surface of one side of the power board and are electrically connected to the high-current conductive plates, and wherein the signal conductive plates are located on a side which is opposed to a side along which the capacitors are arranged and each of the signal conductive plates has one end electrically connected to a wiring pattern formed on the power board and another end electrically connected to the control board, wherein each of the signal conductive plates has a first path passing from the frame-like insulating resin to the power board and a second path passing from the frame-like insulating resin to the control board, and wherein a gap for absorbing deflection is formed in an area in which the first path and the second path are opposed to each other.

2. An electric power steering apparatus according to claim wherein portions where electrical connection to the power board and the control board is made are located inside the frame-like insulating resin, wherein each of the signal conductive plates has a first path passing from the frame-like insulating resin to the power board and a second path passing from the frame-like insulating resin to the control board, and wherein a gap for absorbing deflection is formed in an area in which the first path and the second path are opposed to each other.

3. An electric power steering apparatus according to claim 1, wherein the signal conductive plates are pressed against the power board by an elastic force due to deflection of the first paths.

4. An electric power steering apparatus according to claim 2, wherein the signal conductive plates are pressed against the power board by an elastic force due to deflection of the first paths.

5. An electric power steering apparatus, comprising:
an electric motor for outputting an assist torque to a handle of a vehicle; and
a controller for controlling drive of the electric motor,
wherein the controller comprises:
a power board, on which a bridge circuit including a plurality of semiconductor switching elements for switching a current of the electric motor according to the assist torque is mounted;
capacitors for absorbing a ripple of the current switched by the plurality of semiconductor switching elements;
a control board, on which a microcomputer for generating a drive signal for controlling the bridge circuit based on a steering torque of the handle is mounted; and
a connection member formed by insert molding high-current conductive plates, through which a high current flows, and signal conductive plates, to/from which a low-current signal is input/output, with a frame-like insulating resin provided in proximity to an outer periphery of the power board, wherein the capacitors are arranged in a row along an end surface of one side of the power board and are electrically connected to the high-current conductive plates, and wherein the signal conductive plates are located on a side which is opposed to a side along which the capacitors are arranged and each of the signal conductive plates has one end electrically connected to a wiring pattern formed on the power board and another end electrically connected to the control board, the apparatus further comprising a housing into which conductive plates are formed by insert molding with an insulating resin, wherein a vertical portion is formed on an end of each of the conductive plates, which is exposed from the insulating resin inside the housing to reach the control board, and wherein the vertical portion is inserted into each of through holes of the control board so as to be electrically connected to the wiring pattern of the control board, while a part of a horizontal portion in connection with the vertical portion is covered with the insulating resin.

6. An electric power steering apparatus according to claim 5, wherein portions where electrical connection to the power board and the control board is made are located inside the frame-like insulating resin, the apparatus further comprising a housing into which conductive plates are formed by insert molding with an insulating resin wherein a vertical portion is formed on an end of each of the conductive plates, which is exposed from the insulating resin inside the housing to reach the control board, and wherein the vertical portion is inserted into each of through holes of the control board so as to be electrically connected to the wiring pattern of the control board, while a part of a horizontal portion in connection with the vertical portion is covered with the insulating resin.

7. An electric power steering apparatus, comprising:
an electric motor for outputting an assist torque to a handle of a vehicle; and
a controller for controlling drive of the electric motor,
wherein the controller comprises:
a power board, on which a bridge circuit including a plurality of semiconductor switching elements for switching a current of the electric motor according to the assist torque is mounted;
capacitors for absorbing a ripple of the current switched by the plurality of semiconductor switching elements;
a control board, on which a microcomputer for generating a drive signal for controlling the bridge circuit based on a steering torque of the handle is mounted; and
a connection member formed by insert molding high-current conductive plates, through which a high current flows, and signal conductive plates, to/from which a low-current signal is input/output, with a frame-like insulating resin provided in proximity to an outer periphery of the power board, wherein the capacitors are arranged in a row along an end surface of one side of the power board and are electrically connected to the high-current conductive plates, and wherein the signal conductive plates are located on a side which is opposed to a side along which the capacitors are arranged and each of the signal conductive plates has one end electrically connected to a wiring pattern formed on the power board and another end electrically connected to the control board, the apparatus further comprising a heat sink to which the power board is fixed,
wherein a highly thermally conductive heat releaser is mounted between the heat sink and the capacitors.

8. An electric power steering apparatus according to claim 7, wherein portions where electrical connection to the power board and the control board is made are located inside the frame-like insulating resin,
the apparatus further comprising a heat sink to which the power board is fixed,
wherein a highly thermally conductive heat releaser is mounted between the heat sink and the capacitors.

9. An electric power steering apparatus according to claim 7, wherein the highly thermally conductive heat releaser comprises a highly thermally conductive adhesive mounted between the heat sink and side surfaces and head portions of the capacitors.

10. An electric power steering apparatus according to claim 8, wherein the highly thermally conductive heat releaser comprises a highly thermally conductive adhesive mounted between the heat sink and side surfaces and head portions of the capacitors.

* * * * *